United States Patent
Sim

(10) Patent No.: US 7,861,614 B2
(45) Date of Patent: Jan. 4, 2011

(54) APPARATUS FOR OPERATING A DISTRIBUTION CHUTE FOR CHANGING ORES AND COALS INTO A FURNACE

(75) Inventor: Man-Jo Sim, Pohang (KR)

(73) Assignee: Posco, Pohang-shu (KR)

( * ) Notice: Subject to any disclaimer, the term of this patent is extended or adjusted under 35 U.S.C. 154(b) by 1397 days.

(21) Appl. No.: 10/564,045

(22) PCT Filed: Jul. 9, 2004

(86) PCT No.: PCT/KR2004/001698

§ 371 (c)(1),
(2), (4) Date: Jan. 9, 2006

(87) PCT Pub. No.: WO2005/005669

PCT Pub. Date: Jan. 20, 2005

(65) Prior Publication Data

US 2006/0233630 A1    Oct. 19, 2006

(30) Foreign Application Priority Data

Jul. 9, 2003    (KR) .................. 10-2003-0046495

(51) Int. Cl.
  *G05G 1/00*    (2006.01)
(52) U.S. Cl. ..................... 74/469; 432/95; 432/197; 414/206
(58) Field of Classification Search ............... 74/469, 74/25; 432/95, 96, 197; 414/206, 208
See application file for complete search history.

(56) References Cited

U.S. PATENT DOCUMENTS

| 4,243,351 | A |   | 1/1981 | Legille et al. .............. 414/206 |
| 4,525,120 | A |   | 6/1985 | Legille et al. .............. 414/160 |
| 4,547,116 | A |   | 10/1985 | Legille et al. .............. 414/160 |
| 4,729,549 | A | * | 3/1988 | Lonardi et al. .............. 266/176 |
| 6,213,275 | B1 | * | 4/2001 | Lonardi et al. .............. 193/16 |
| 6,578,694 | B2 | * | 6/2003 | Harris et al. ................. 193/16 |
| 6,948,930 | B2 | * | 9/2005 | Brzoska et al. .............. 432/95 |
| 6,981,831 | B2 | * | 1/2006 | Lonardi et al. .............. 414/174 |
| 7,513,729 | B2 | * | 4/2009 | Kepplinger et al. ......... 414/299 |

FOREIGN PATENT DOCUMENTS

| JP | 57-166472 A | 10/1982 |
| JP | 63-100114   | 5/1988  |
| JP | 8-35006     | 2/1996  |

OTHER PUBLICATIONS

International Search Report in PCT/KR2004/001698 dated Oct. 29, 2004.
Written Opinion in PCT/KR2004/001698 dated Oct. 29, 2004.

* cited by examiner

*Primary Examiner*—David M Fenstermacher
(74) *Attorney, Agent, or Firm*—Marshall, Gerstein & Borun LLP

(57) ABSTRACT

A driving apparatus for a blast furnace charging distribution chute includes: a driving unit comprising a crankshaft connected to a motor to rotate with a variable rotational radius; a power transmission unit comprising a plurality of connection rods connected to the driving unit to linearly transmit power; and a working unit connected to the power transmission unit and fixed to circumference of a distribution chute to rotate or tilt the distribution chute.

19 Claims, 11 Drawing Sheets

APPARATUS FOR OPERATING A DISTRIBUTION CHUTE FOR CHANGING ORES AND COALS INTO A FURNACE

CROSS-REFERENCE

This application claims the priority of Korean Patent Application No. 2003-0046495, filed on Jul. 9, 2003, in the Korean Intellectual Property Office, the disclosure of which is incorporated herein in its entirety by reference.

BACKGROUND OF THE INVENTION (a) Field of the Invention

The present invention relates to a driving apparatus for a blast furnace charging distribution chute, and more specifically, to a driving apparatus capable of adjusting tilt and rotation of the blast furnace charging distribution chute to uniformly charge iron core and coal into the blast furnace.

(b) Description of Related Art

As one of the oldest industries growing with the development of mankind, steel industry is a key industry that supplies basic materials for overall industries such as automobiles, ships, consumer electronics and constructions. Iron mills which play an integral role in the steel industries use iron core and coal as a raw material to fabricate molten iron, which is molten pig iron. Next, steel is fabricated by using the molten iron and finally delivered to consumers.

In general, the molten iron is fabricated in blast furnaces such as shaft furnaces and melting gas furnaces. A process for fabricating the molten iron is as follows. Firstly, the iron ore and coal are charged into the blast furnace and a high-temperature hot blast or oxygen is injected through tuyeres. Next, the charged coal is heated. By using the heated coal as a heat source, the iron ore is molten and reduced to obtain the molten iron. When the molten iron is fabricated as described above, distribution of the charged materials in the blast furnace has a significant influence on quality of the molten iron. Therefore, it is important to uniformly charge iron core and coal into the blast furnace. Accordingly, the driving apparatus for the blast furnace charging distribution chute has been constantly developed in order to uniformly charge the iron core and coal into the blast furnace. Now, a conventional driving apparatus for a blast furnace charging distribution chute will be described with reference to FIG. 10.

FIG. 10 is a perspective view showing a conventional driving apparatus 500 for a blast furnace charging distribution chute 530. The driving apparatus 500 drives the blast furnace charging distribution chute 530 which has a function of charging the iron ore and coal into the blast furnace.

As shown in FIG. 10, the conventional driving apparatus 500 for the blast furnace charging distribution chute 530 is mounted on an upper portion of the blast furnace 540 to supply the iron ore and coal provided from iron ore and coal hoppers 550 and 560, respectively, to the blast furnace 540. A motor 502 is used for tilt and rotation driving of the blast furnace charging distribution chute 530. The blast furnace charging distribution chute 530 is tilted and rotated by using the motor 502 in the following manner.

Firstly, ring gears 506 vertically stacked along a rotation reducer 504 and reduction gears 520 are circularly rotated by driving the motor 502. When the ring gears 506 is circularly rotated, a tilt reducer 510 arranged at one sides of the ring gears 506 allows the blast furnace charging distribution chute 530 to be tilted in the radial direction of the blast furnace 540. Therefore, the iron ore and the coal charged into the blast furnace 540 can be uniformly distributed by the blast furnace charging distribution chute 530.

However, since the conventional driving apparatus 500 for the blast furnace charging distribution chute 530 comprises a large number of ring gears 506 and reduction gears 520, there is a problem in that frequent breakdowns due to the complicated arrangement occur. Thus, on-demand repair or replacement for the associated parts should be made.

In addition to the frequent breakdowns of the rotation reducer 504 and the tilt reducer 510, parts of the rotating body may not maintain air-tightness due to high-temperature blast coming from the blast furnace 540. Therefore, there is a problem in that cooling efficiency may be degraded and cooling water may be flowed into the blast furnace 540. Moreover, bearings for supporting these rotating reducers may be degraded, so that it is difficult to use the bearings for a long time.

SUMMARY OF THE INVENTION

In order to solve the aforementioned problems, the present invention provides a driving apparatus for a blast furnace charging chute capable of smoothly performing tilt and rotation driving to uniformly distribute charged materials.

Further, the present invention also provides a blast furnace charging distribution chute capable of facilitating maintenance and repair to improve endurance.

According to an aspect of the present invention, there is provided a driving apparatus for a blast furnace charging distribution chute, comprising: a driving unit comprising a crankshaft connected to a motor to rotate with a variable rotational radius; a power transmission unit comprising a plurality of connection rods connected to the driving unit to linearly transmit power; and a working unit connected to the power transmission unit and fixed to circumference of a distribution chute to rotate or tilt the distribution chute.

In addition, the driving unit may further comprise a cylinder, wherein the cylinder is connected to the crankshaft to vary the rotational radius of the crankshaft.

In addition, the driving unit may further comprise: a load-side lever rotatably connected to a driving shaft of the motor; a first weight having one end connected to the load-side lever and the other end connected to the crankshaft; a no-load side lever rotatably connected to the cylinder; and a second weight having one end connected to the no-load side lever and the other end connected to the crankshaft, and wherein the first and second weights balance reciprocation of the crankshaft.

In addition, the cylinder may be fixed to a no-load side crankshaft, wherein the crankshaft is interposed between a load-side crankshaft connected to the motor and the no-load side crankshaft opposite to a load-side, and the load side crankshaft and the no-load side crankshaft are located in the same axis line.

In addition, the cylinder may be hydraulically driven, wherein oil for the hydraulic drive is supplied by using a rotary joint and the no-load side crankshaft.

In addition, the crankshaft may rotate around a central axis of the motor in parallel with the central axis.

In addition, the cylinder may be hydraulically driven.

In addition, the power transmission unit may comprise: a first connection rod for transmits power, the first connection rod having one end connected to the crankshaft and the other end connected to the working unit; and a second connection rod for transmitting power, the second connection rod having one end connected to the crankshaft and the other hand connected to the working unit at a predetermined angle with the first connection rod, and wherein the second connection rod transmits power through link members connected to both ends of the second connection rod.

In addition, the second connection rod may be supported by a fixing member connected to the lower portion thereof.

In addition, the first connection rod and one of the link members may be connected to each other through the crankshaft substantially, wherein the first connection rod is at right angle with the one of the link members.

In addition, the working unit may comprise: a first driving lever connected to the first connection rod and fixed to the circumference of the distribution chute; and a second driving lever connected to the link member connected to the second connection rod and fixed to the circumference of the distribution chute, wherein the first and second driving levers are fixed together to a driving body protruded from the circumference of the distribution chute.

In addition, the first driving lever may drive an outer driving ring extending from both sides of the driving body around the circumference surface of the distribution chute.

In addition, both ends of the outer driving ring may be fixed to bearings arranged in the circumference surface of the distribution chute to allow the outer driving ring to rotate around a center of the bearing.

In addition, the distribution chute may be driven by rotating the outer driving ring.

In addition, the second driving lever may drive an inner lever horizontally extending from one side of the driving body along the circumference surface of the distribution chute.

In addition, an end of the inner lever may be placed adjacent to a guide member arranged on the circumference surface of the distribution chute to allow the inner lever to rotate in support of the guide member.

In addition, the distribution chute may be driven by rotating the inner lever.

In addition, the driving body may comprise: a first driving body connected to the first driving lever, wherein an opening is provided to the first driving body along the axis thereof; and a second driving body connected to the second driving lever, wherein the second driving body is inserted into the opening of the first driving body.

In addition, the distribution chute may be a cylindrical type.

DETAILED DESCRIPTION OF PREFERRED EMBODIMENTS

The present invention will now be described more fully with reference to the accompanying drawings, in which exemplary embodiments of the invention are shown. However, the invention may, however, be embodied in many different forms and should not be construed as being limited to the embodiments set forth herein.

Figure 1:
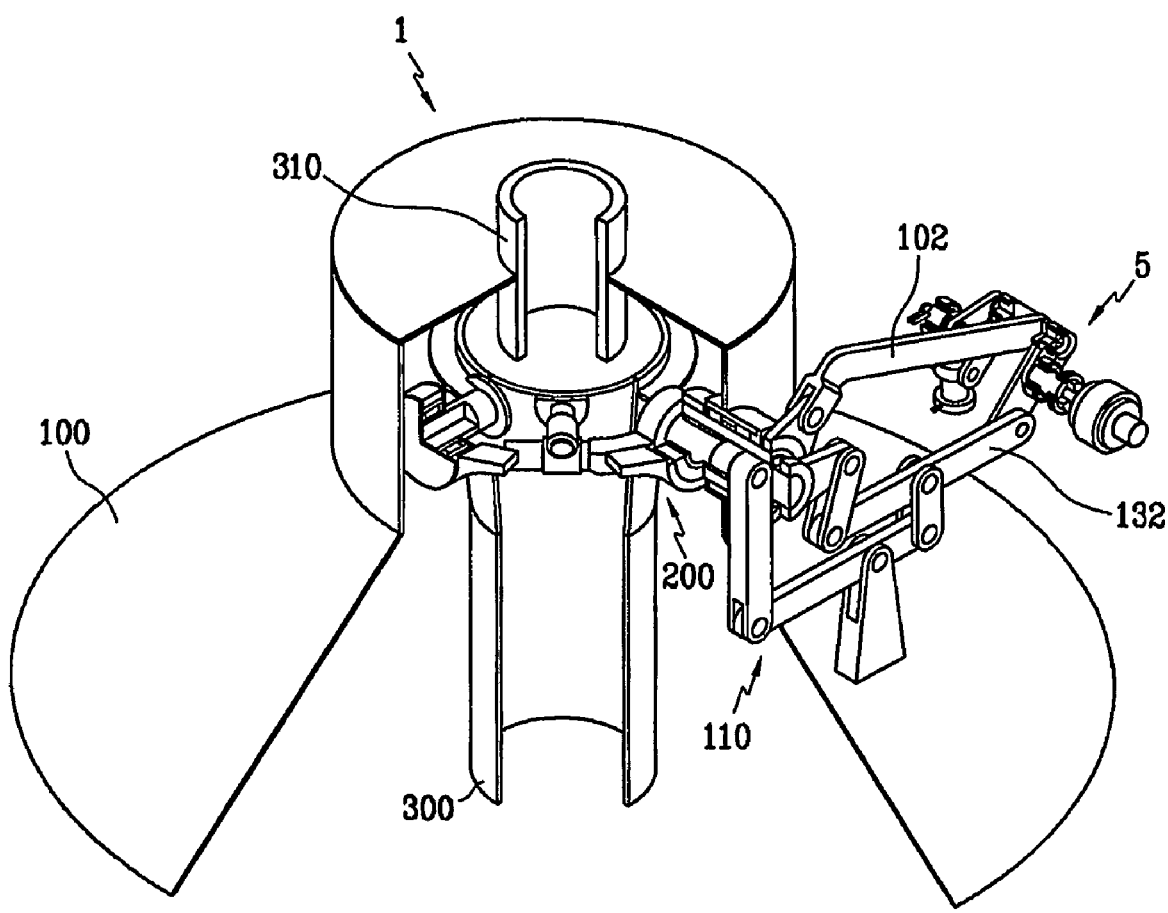
FIG. 1 is a perspective view showing a driving apparatus for a blast furnace charging distribution chute according to a first embodiment of the present invention.

FIG. 1 is a perspective view showing a driving apparatus for a blast furnace charging distribution chute according to a first embodiment of the present invention. The driving apparatus 1 comprises a driving unit 5, a power transmission unit 110 and a working unit 200. For convenience sake, a sheet iron shell 100, an upper chute 310 and a distribution chute 300 are partially dissected in FIG. 1. The distribution chute 300 is of a cylindrical type, so that rotation and tilt driving are easily performed. Therefore, iron ore and coal can be uniformly charged.

The driving unit 5 comprises a crankshaft 50 (shown in FIG. 2) connected to a motor 14 (shown in FIG. 2) to rotate with a variable rotational radius. The power transmission unit 110 connected to the driving unit 5 comprises a plurality of connection rods 102 and 132 which linearly transmit power. Further, the working unit 200 connected to the power transmission unit 110 receives a driving force generated by the driving unit 5 through the power transmission unit 110 to rotate or tilt the distribution chute 300. Accordingly, the iron ore or the coal charged into the blast furnace via the upper chute 310 can be uniformly distributed.

As described above, the driving apparatus 1 for the blast furnace charging distribution chute 300 according to the first embodiment of the present invention rotates and tilts the distribution chute 300 through interaction of the driving unit 5, the power transmission unit 110 and the working unit 200 to uniformly charge the iron ore and coal into the blast furnace. Now, the driving unit 5 which generates the driving power for driving the distribution chute 300 will be described in detail with reference to FIGS. 2 and 3.

Figure 2:
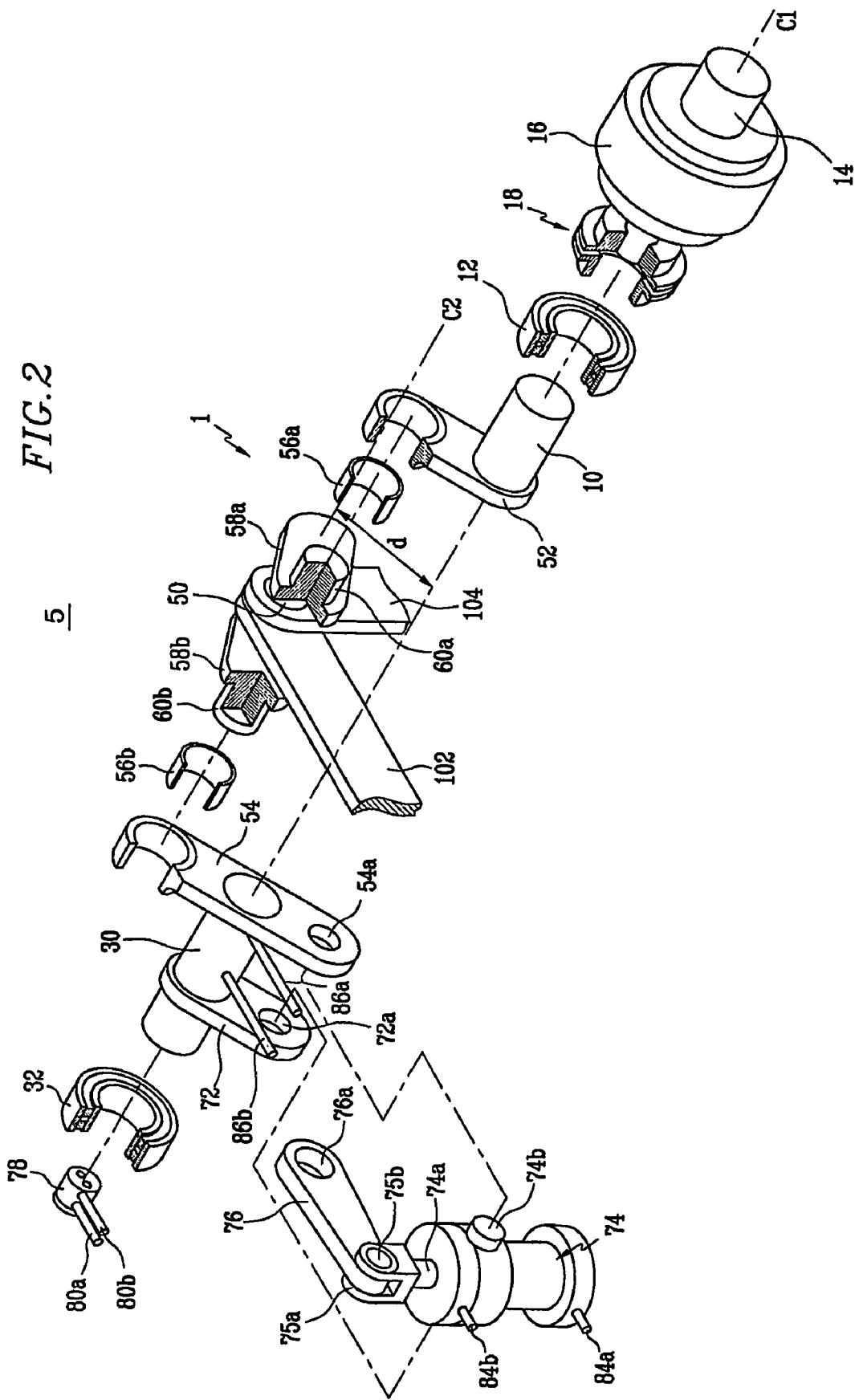
FIG. 2 is an exploded view showing a driving unit for a blast furnace charging distribution chute according to the first embodiment of the present invention.

FIG. 2 is an exploded view showing the driving unit 5 for the blast furnace charging distribution chute 300 according to the first embodiment of the present invention. The driving unit 5 is exploded in a rotational axis.

The driving unit 5 comprises an crankshaft 50 rotated by the motor 14 and a cylinder 74 for adjusting a rotational radius of the crankshaft 50.

The driving unit 5 can be roughly divided into a load-side crankshaft 10, a no-load side crankshaft 30 and a crankshaft 50. The load-side crankshaft 10 and the no-load side crankshaft 30 are rotated around a central line C1 and supported by bearings 12 and 32, respectively, for smooth rotation. The crankshaft 50 interposed between the load-side crankshaft 10 and the no-load side crankshaft 30 is rotated around a variable axis between central lines C2 and C1. While a distance d between the central lines C1 and C2 is variably adjusted, the distribution chute is appropriately driven. Now, the aforementioned three parts of the distribution chute will be separately described.

Firstly, the load-side crankshaft 10 has a function of rotating the no-load side crankshaft 30 and the crankshaft 50. The load-side crankshaft 10 is connected to the motor 14, a reducer 16 and a coupling 18, so that the load-side crankshaft 10 receives the driving force from the motor 14 and the reducer 16 to rotate. The crankshaft 50 is variably rotated according to the rotation of the load-side crankshaft 10.

Next, the crankshaft 50 receiving power from the load-side crankshaft 10 will be described. The driving unit 5 comprises a load-side lever 52 rotatably connected to a driving shaft of the motor 14, a first weight 58a having the one end connected to the load-side lever 52 and the other end connected to the crankshaft 50, a no-load side lever 54 rotatably connected to the cylinder 74, and a second weight 58b having the one end connected to the no-load side lever 54 and the other end connected to the crankshaft 50. Here, the first and second weights 58a and 58b have a function of balancing a reciprocal motion of the crankshaft 50.

The first weight 58a is connected to the one end of the crankshaft 50, and a first crank arm 60a having a bearing 56a is fixed attached to an outer side of the first weight 58a. The crankshaft 50 is interposed between the second weight 58b and the first weight 58a, and a second crank arm 60b having a bearing 60b is fixedly attached to an outer side of the second weight 58b.

The first weight 58a is connected to the load-side crankshaft 10 via the load-side lever 52 to transmit a rotational force of the motor 14 to the crankshaft 50. Therefore, the crankshaft 50 rotates around the central axis of the motor 14 in parallel with the central axis C1. In addition, the crankshaft 50 connected to the first and second crank arms 60a and 60b is circularly rotated to linearly reciprocate the first and second connection rods 102 and 132 (shown in FIG. 6) connected to the crankshaft 50. The second connection rod is connected to the crankshaft 50 via a link member 104.

Finally, the driving of the no-load side crankshaft 30 will be described. The no-load side crankshaft 30 has a function of varying the rotational radius of the crankshaft 10 by using the cylinder 74 at the time of rotation of the crankshaft 10. The no-load side crankshaft 30 connected to the no-load side lever 54 rotates around the central line C1, and the crankshaft 50 variably rotates around the central line C2.

The cylinder 74 is connected to the no-load side crankshaft 30, and the crankshaft 50 is interposed between the load-side crankshaft 10 connected to the motor 14 and the no-load side crankshaft 30 opposite to the load-side crankshaft 10. Further, the load-side crankshaft 10 and the no-load side crankshaft 30 are located in the same axis, that is, the central line C1. The cylinder 74 connected to the no-load crankshaft 30 is connected through the no-load side lever 54 and a connection lever 72 fixed to the no-load side crankshaft 30.

A connection block 75a arranged on a cylinder rod 74a of the cylinder 74 is coupled to one end of the driving lever 76 through a pin 75b. Further, the other end of the driving lever 76 has an opening 76a to which the no load-side lever 54 is fixed. The cylinder 74 is fixedly coupled between an opening 72a provided at the one end of the connection lever 72 and an opening 54a of the no-load side lever 54 by using a protrusion unit 74b provided on the circumference of the cylinder 74. The cylinder 74 is hydraulically driven with hydraulic oil supplied from a rotary joint 78 which is inserted into the no-load crankshaft 30. For the hydraulic driving, hydraulic ports 80a, 80b, 86a and 86b through which the hydraulic oil flows are arranged in the rotary joint 78, the no-load side crankshaft 30 and the cylinder 74 to supply or drain the hydraulic oil to or from hydraulic ports 84a and 84b of the cylinder 74.

In a case where the crankshaft 50 is rotated by driving the motor 14, if the cylinder 74 moves the cylinder rod 74a forward, the no-load side crankshaft 30 connected to the driving lever 76 is rotated and the crankshaft 50 connected to the no-load side crankshaft 30 is rotated while the central line C2 moves close to the central line C1 of the no-load side crankshaft 30. On the contrary, if the cylinder 74 moves the cylinder rod 74a backward, the no-load side crankshaft 30 connected to the driving lever 76 is rotated and the crankshaft 50 connected to the no-load side crankshaft 30 is rotated while the central line C2 moves to be separated from the central line C1 of the no-load side crankshaft 30.

Figure 3:
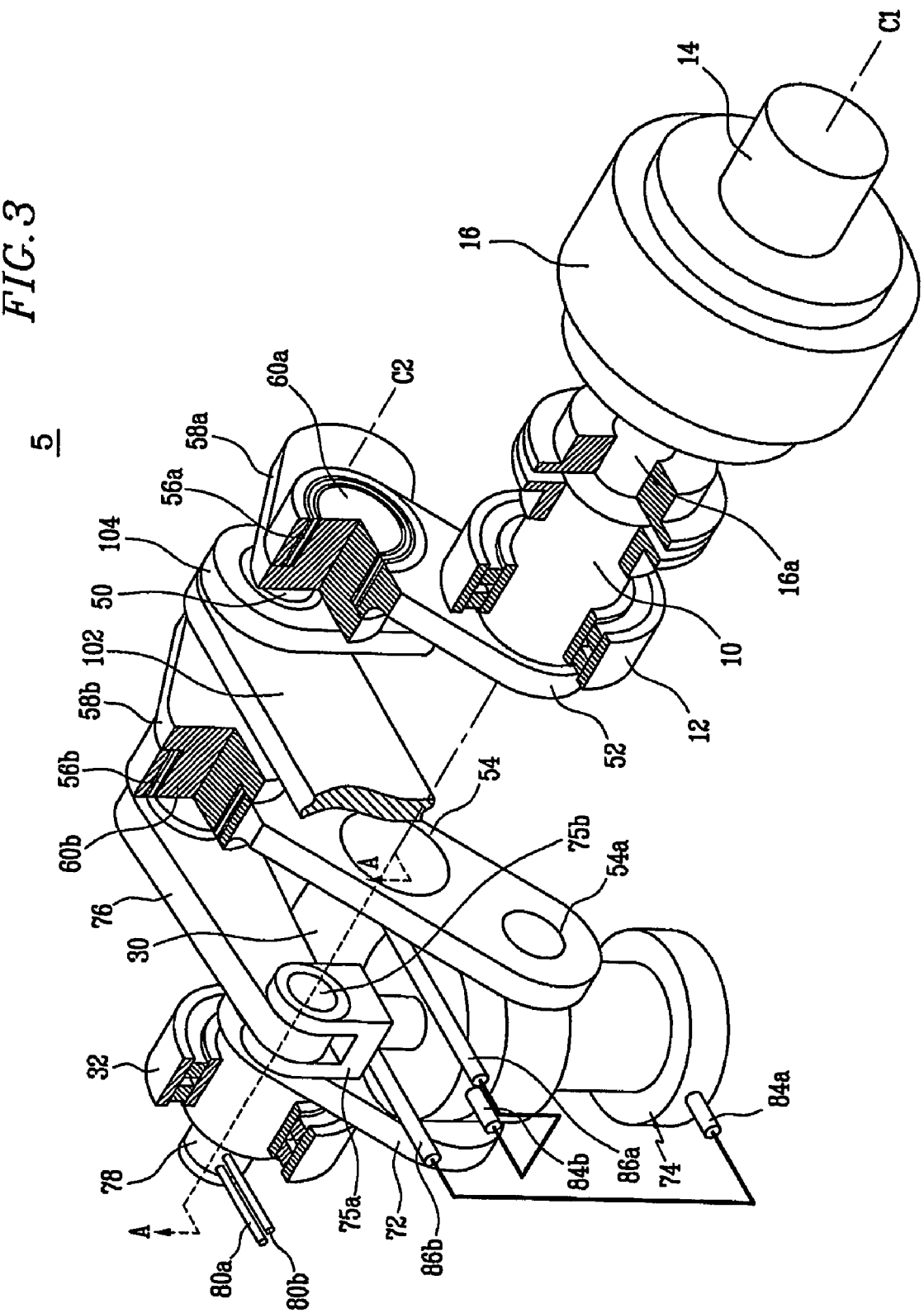
FIG. 3 is a perspective view showing a driving unit for a blast furnace charging distribution chute according to the first embodiment of the present invention.

FIG. 3 is a perspective view showing the driving unit for the blast furnace charging distribution chute according to the first embodiment of the present invention, in which the driving unit 5 shown in FIG. 2 is assembled.

When the crankshaft 50 is rotated by driving the motor 14, the first connection rod 102 connected to the crankshaft 50 and the second connection rod 132 connected to the first link member 104 linearly moves (hereinafter, shown in FIG. 6). Here, when the cylinder 74 is driven, the rotational radius of the crankshaft 50 is varied, so that the stroke sizes of the first and second connection rods 102 and 132 are varied. This will be described later in detail.

At the time of driving the crankshaft 50, in a case where the cylinder 74 moves forward, the distance between the central lines C1 and C2 becomes narrower, so that the stroke sizes of the first and second connection rods 102 and 132 connected to the crankshaft 50 can be reduced. On the other hand, in a case where the cylinder 74 moves backward, the distance between the central lines C1 and becomes longer, so that the stroke sizes of the first and second connection rods 102 and 132 can be increased. By simply manipulating the cylinder 74 as described above, the rotational radius of the crankshaft 50 is varied, so that the stroke sizes of the first and second connection rods 102 and 132 can be adjusted.

Now, the hydraulic driving process of the cylinder to adjust the stroke sizes of the first and the second connection rods 102 and 132 will be described in detail with reference to FIG. 4.

Figure 4:
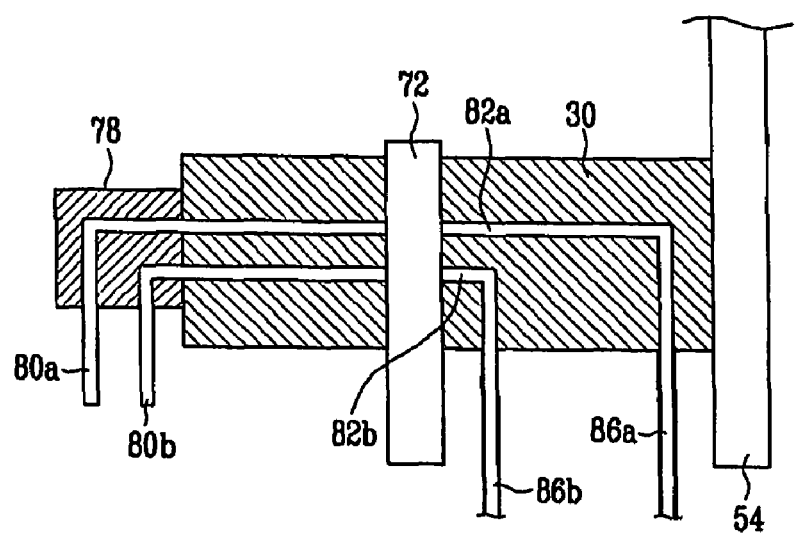
FIG. 4 is a cross sectional view taken along with line A-A of FIG. 3.

FIG. 4 is a cross sectional view taken along with line A-A of FIG. 3, in which the principle of the hydraulic driving of the cylinder is illustrated.

As shown in FIG. 4, the hydraulic oil flowing through the hydraulic port 80a arranged in the rotary joint 78 is supplied along a hydraulic pipeline 82a through the no-load side crankshaft 30 to the hydraulic port 86a. The hydraulic oil drained out by driving the cylinder 74 flows from the hydraulic port 86b through the hydraulic port 80b along a hydraulic pipeline 82b. Like this, the hydraulic oil can be supplied through the rotary joint 78 and the no-load side crankshaft 30.

Figure 5:
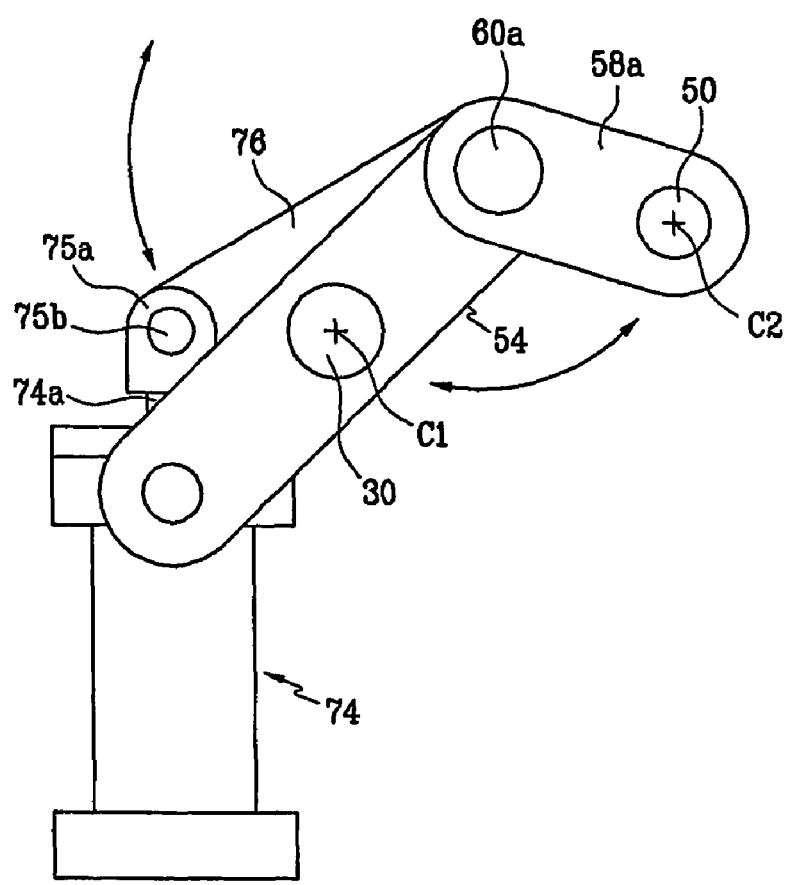
FIG. 5 is a conceptual view showing operation of a driving unit for a blast furnace charging distribution chute according to the first embodiment of the present invention.

FIG. 5 is a conceptual view showing operations of the driving unit for the blast furnace charging distribution chute 300 according to the first embodiment of the present invention, in which the rotational directions of the crankshaft 50 and the connection block 75a are indicated with arrows.

As shown in FIG. 5, the crankshaft 50 extending along the central line C2 rotates around the central line C1 by driving the cylinder 74. In a case where the hydraulic oil flows into the hydraulic pipeline 82a connected to the cylinder 74 through the no-load side crankshaft 30, as the cylinder rod 74a moves forward, the connection block 75a move upward. Accordingly, while the driving lever 75 moves upward, the central line C2 of the crankshaft 50 moves close to the central line C1. In this case, the stroke sizes of the first connection rod (102;

hereinafter, shown in FIG. 6) and the second connection rod (132; hereinafter, shown in FIG. 6) connected to the crankshaft 50 are reduced. In particular, in a case where the cylinder 74 moves forward to the utmost, the central lines C1 and C2 are matched, so that the stroke sizes of the first and second connection rods 102 and 132 become zero.

On the other hand, in a case where the hydraulic oil is drained out to the hydraulic pipeline 82b connected to the cylinder 74 through the no-load side crankshaft 30, as the cylinder rod 74a moves backward, the connection block 73a moves downward. Accordingly, while the driving lever 76 moves downward, the central line C2 of the crankshaft 50 moves far from the central line C1. In this case, the stroke sizes of the first and second connection rods 102 and 132 connected to the crankshaft 50 are gradually increased.

Like this, while the crankshaft 50 located along the central line C1 is rotated, the position of the central line C2 is varied, so that the stroke sizes of the connection rods can be varied.

Figure 6:
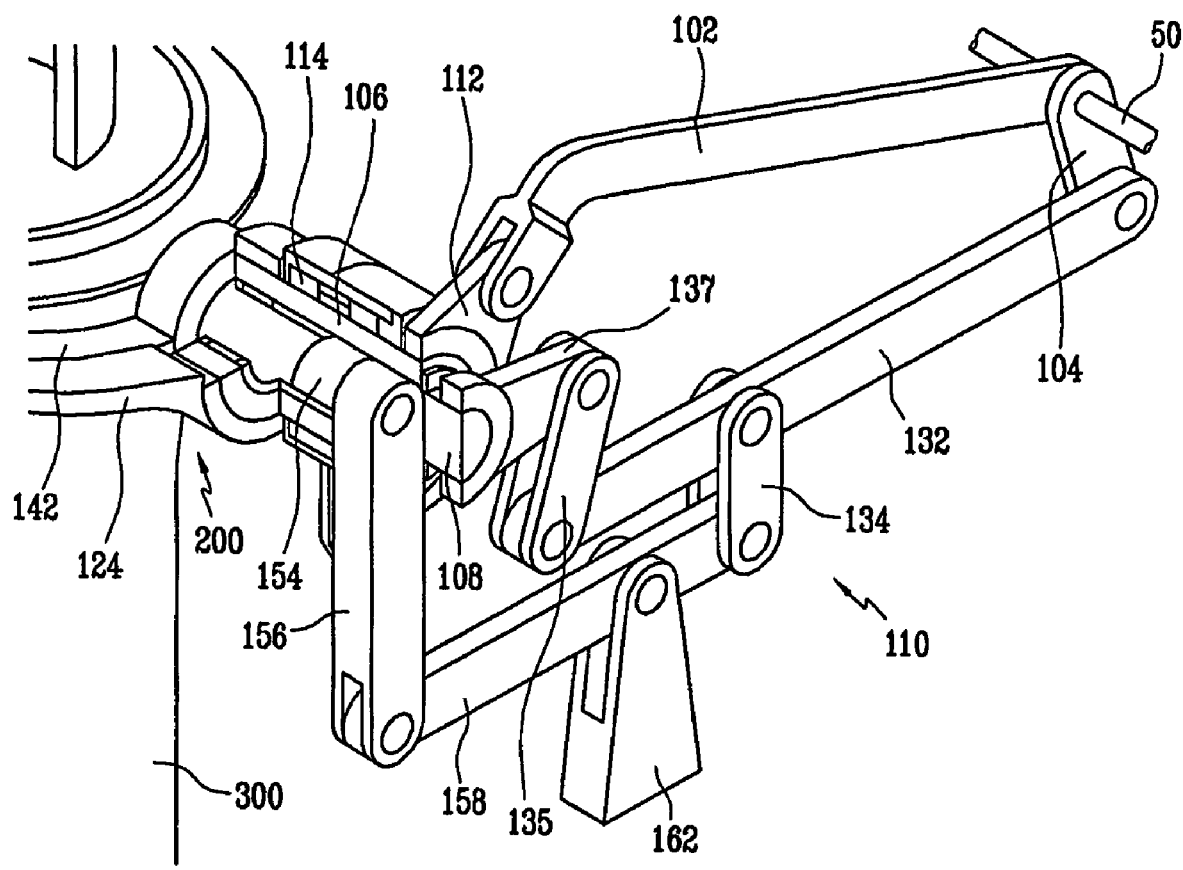
FIG. 6 is a perspective view showing a power transmission unit for a blast furnace charging distribution chute according to the first embodiment of the present invention.

FIG. 6 is a perspective view showing the power transmission unit 110 for the blast furnace charging distribution chute according to the first embodiment of the present invention, which illustrates a state that the power is transmitted to the working unit 200 through the first and second connection rods 102 and 132 connected to the driving unit 5.

As shown in FIG. 6, the power transmission unit 110 comprises the first and second connection rods 102 and 132 for converting a rotational motion of the driving unit 5 into a linear motion thereof. The first connection rod 102 having the one end connected to the crankshaft 50 and the other end connected to the working unit 200 transmits power horizontally. In addition, the second connection rod 132 is connected to the crankshaft 50 and the working unit 200 at a predetermined angle with the first connection rod 102 to transmit power. Here, both ends of the second connection rod 132 is connected to the first and second link members 104 and 135 and is vertically driven to transmit power to the working unit 200.

The first connection rod 102 and the first link member 104 are coupled through the crankshaft 50 substantially at the right angle. Therefore, the working unit 200 is driven with different stroke sizes of the first and second connection rods 102 and 132.

Accordingly, by adjusting the stroke sizes of the first and second connection rods 102 and 132, it is possible to adjust tilt angles of the distribution chute 300 in the forward/backward and leftward/rightward directions. For example, when the stroke sizes of the first and second connection rods 102 and 132 are maximized, the tilt angles of the distribution chute 300 in the forward/backward and leftward/rightward directions become maximized. On the other hand, when the stroke sizes of the first and second connection rods 102 and 132 are minimized or zero, the tilt angles of the distribution chute 300 in the forward/backward and leftward/rightward directions become zero. Therefore, the distribution chute is placed in a vertical direction.

As shown in FIG. 6, the second connection rod 132 is supported with a fixing member 162 connected to the lower portion thereof. The fixing member 162 fixed on the sheet iron shell 100 (shown in FIG. 1) supports a fixing lever 158. One end of the fixing lever 158 is fixed to a second fixing link member 156 and a fixing lever 154 connected thereto, and a first fixing link member 134 is connected to the second connection rod 132. Therefore, the fixing member 162 supports the second connection rod 132 and limits the driving range of the second connection rod 132. Accordingly, the second connection rod 132 together with the first connection rod 102 can be linearly driven without deviation.

Further, the working unit 200 comprises a first driving lever 112 and a second driving lever 137. The first driving lever 112 is connected to the first connection rod 102 and fixed to a circumference of the distribution chute 300, and the second driving lever 137 is connected to the second connection rod 132 and fixed to the circumference of the distribution chute 300. Here, both of the first and second driving levers 112 and 137 are fixed to driving bodies 106 and 108 protruded from the circumference of the distribution chute 300. The driving bodies 106 and 108 rotate according to the rotation of the first and second driving levers 112 and 137, respectively, and are supported by a bearing 114.

The driving bodies 106 and 108 include a first driving body 106 connected to the first driving lever 112 and a second driving body 108 connected to the second driving lever 137. The first driving body 106 connected to the driving lever 112 has an opening in the axis thereof. The second driving body 108 connected to the second driving lever 137 is inserted into the opening of the first driving body 106. The first and second driving bodies 106 and 108 are driven separately.

An outer driving ring 124 connected to the first driving body 106 is fixed on the circumference surface of the distribution chute 300 to drive the distribution chute 300 according to the driving of the first driving lever 112. In addition, an inner lever 142 connected to the second driving body 108 is fixed on the circumference surface of the distribution chute 300 to drive the distribution chute 300 according to the driving of the second driving lever 137.

As described above, the first and second driving levers 112 and 137 are driven according to the driving of the first and second connection rods 102 and 132, respectively. Further, by driving the outer driving ring 124 connected to the first driving lever 112 and the inner lever 142 connected to the second driving lever 137, the distribution chute 300 is driven in the upward/downward and rightward/leftward directions, so that the tilt angle can be adjusted.

Figure 7:
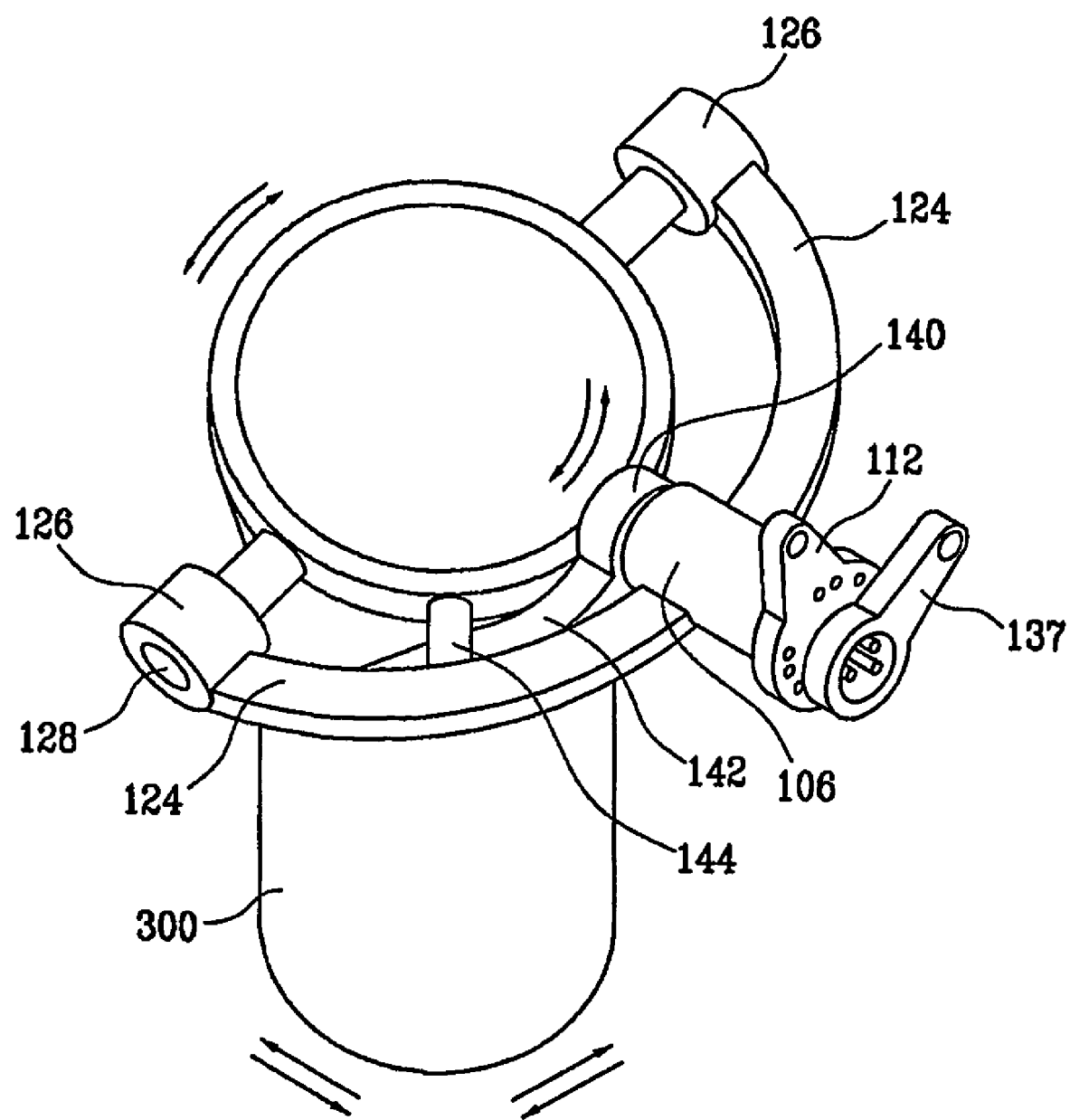
FIG. 7 is a perspective view showing a working unit for a blast furnace charging distribution chute according to the first embodiment of the present invention.

FIG. 7 is a perspective view showing the working unit for the blast furnace charging distribution chute 300 according to the first embodiment of the present invention, which illustrates a state that the outer driving ring 124 and the inner driving lever 142 are driven by the first and the second driving levers 112 and 137, respectively.

As shown in FIG. 7, the first driving lever 112 connected to the first connection rod (not shown) is driven by the linear motion of the first connection rod, so that the outer driving ring 124 connected to the first driving body 106 is driven. The outer driving ring 124 extends around the circumference surface of the distribution chute 300 from both sides of the first driving body 106. Both ends of the outer driving ring 124 are fixed with the bearing 128 arranged on the circumference surface of the distribution chute 300 to rotate around the bearing 128. The bearing 128 received into a bearing housing 126 is fixed on the circumference surface of the distribution chute 300.

With this arrangement, the outer driving ring 124 can be rotated to drive the distribution chute 300. In other words, the outer driving ring 124 connected to the first driving lever 112 is rotated according to the driving of the first driving lever 112, and the distribution chute 300 is driven according to the rotation of the outer driving ring 124 in the arrow direction shown in the upper portion of FIG. 7.

Further, the second driving lever 137 connected to the second connection rod (not shown) is rotated by the linear motion of the second connection rod 132, so that the inner lever 142 connected to the second driving body 140 can be driven. The inner lever 142 extends from one side of the second driving body 140 along the circumference surface of the distribution chute 300. Since the end of the inner lever 142 is adjacent to a guide member 144 arranged on the circumference of the distribution chute 300, the inner lever 142 can be rotated in support of the guide member 144.

With the above arrangement, the inner lever 142 is rotated to drive the distribution chute 300. In other words, the inner lever 142 connected thereto is rotated according to the driving of the second driving lever 137, and the distribution chute 300 is driven according to the rotation of the inner lever 142 in an arrow direction shown in the lower portion of FIG. 7.

Figure 8:
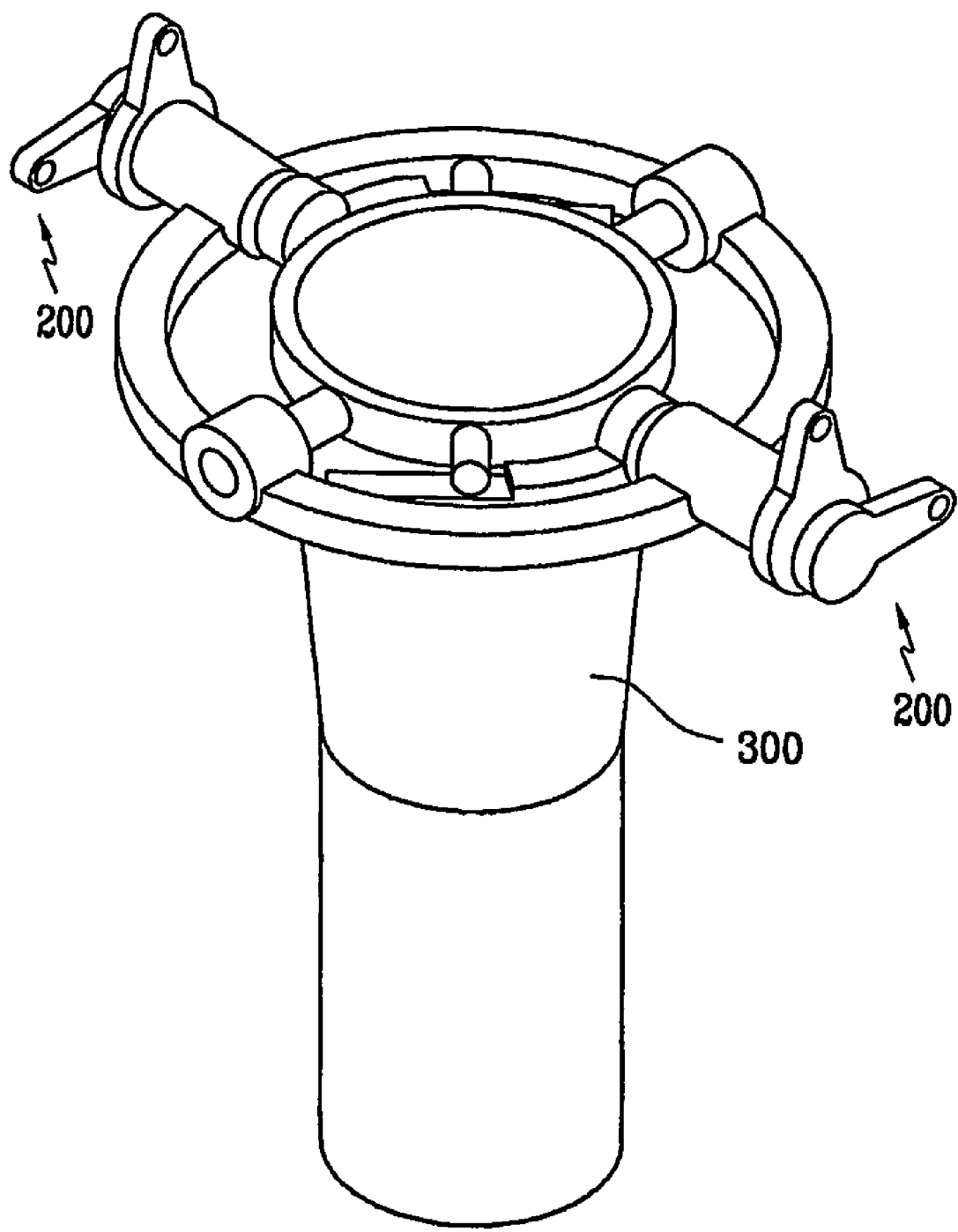
FIG. 8 is a schematic view showing a driving apparatus for a blast furnace charging distribution chute according to a second embodiment of the present invention.
Figure 9A:
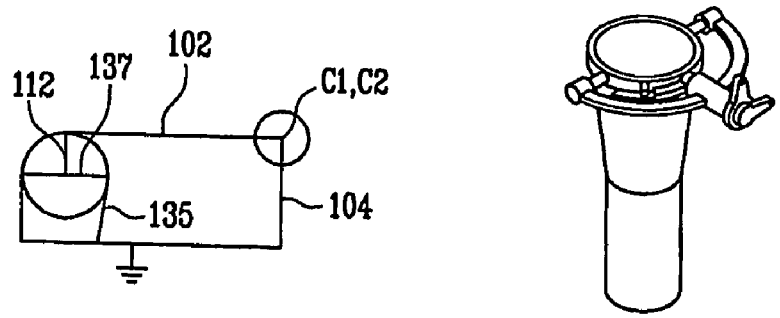
FIGS. 9A to 9I are views showing operations of a driving apparatus for a blast furnace charging distribution chute according to the first embodiment of the present invention.
Figure 9B:
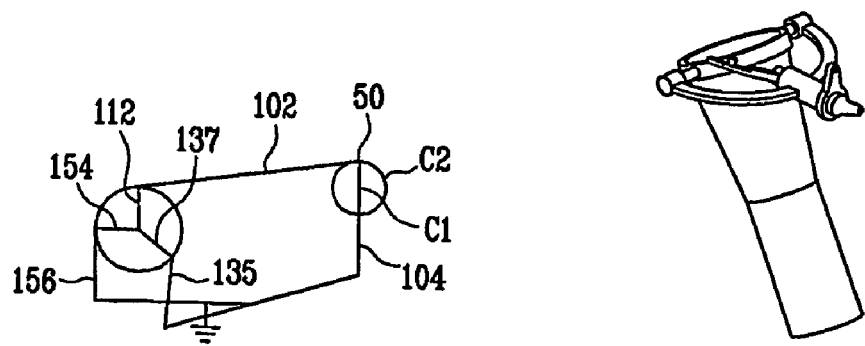
Figure 9C:
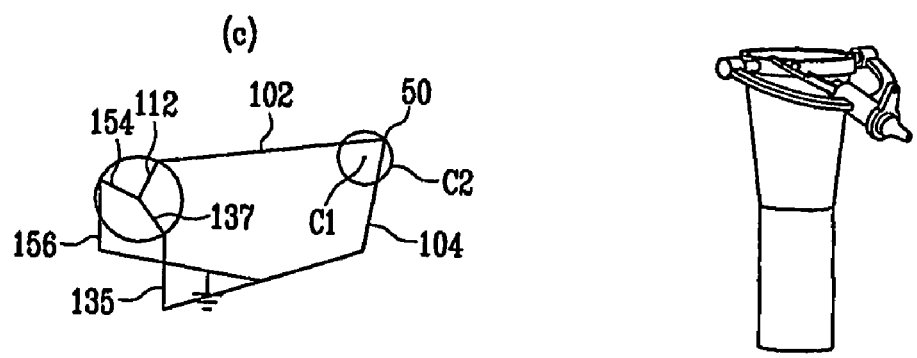
Figure 9D:
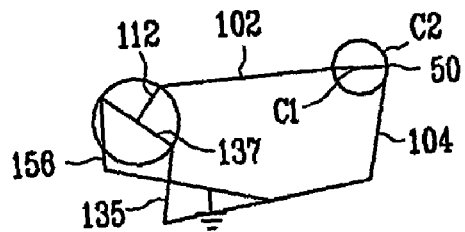
Figure 9D:
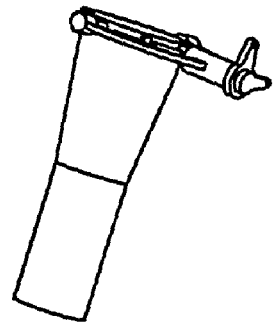
Figure 9E:
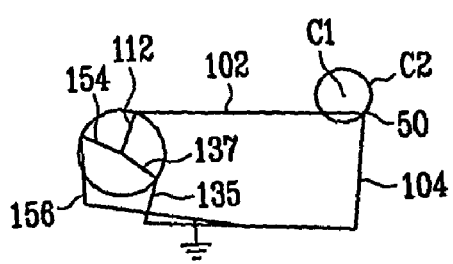
Figure 9E:
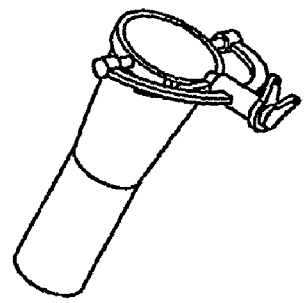
Figure 9F:
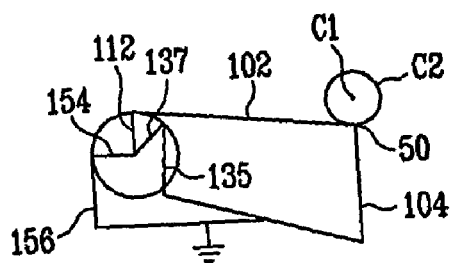
Figure 9F:
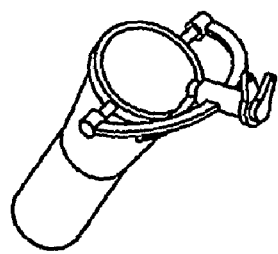
Figure 9G:
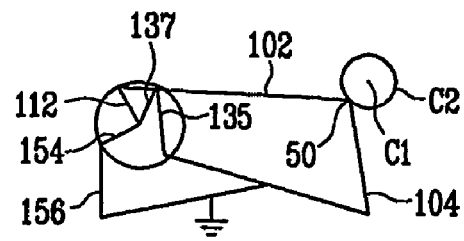
Figure 9G:
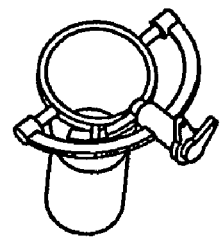
Figure 9H:
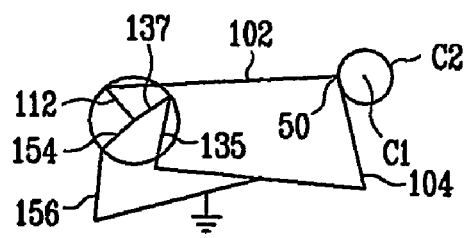
Figure 9H:
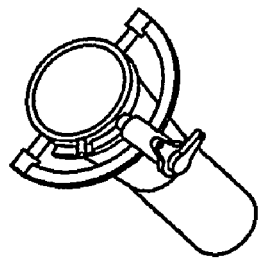
Figure 9I:
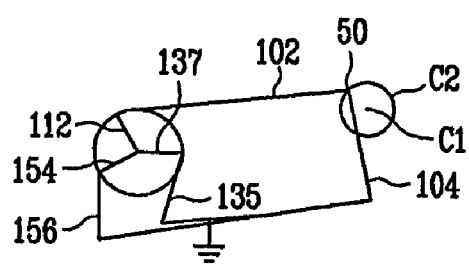
Figure 9I:
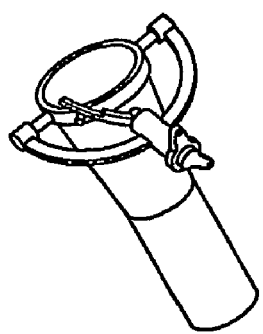
Figure 10:
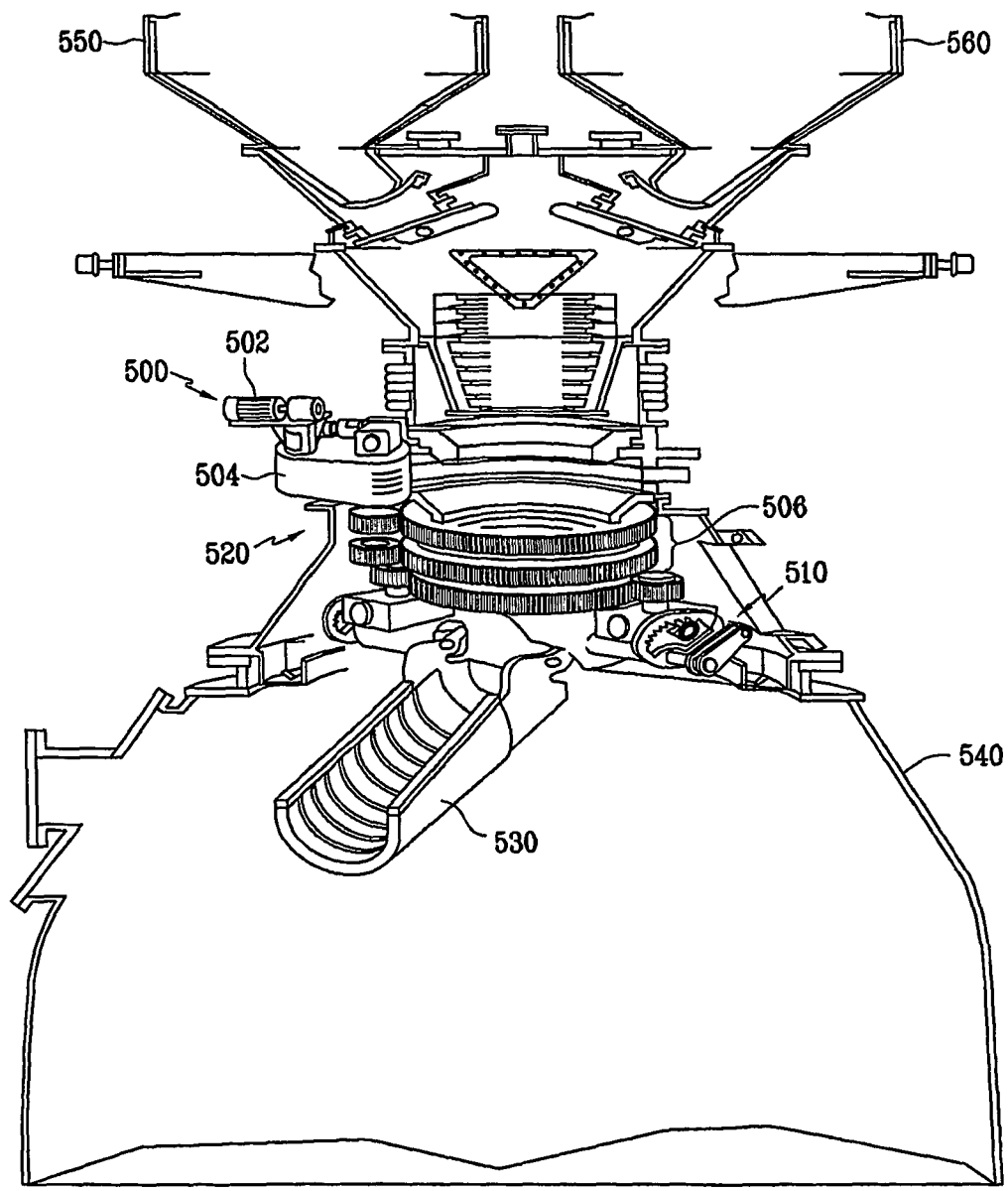
FIG. 10 is a perspective view showing a conventional driving apparatus for a blast furnace charging distribution chute.

FIG. 8 is a schematic view showing a driving apparatus for the blast furnace charging distribution chute according to a second embodiment of the present invention, in which the driving apparatus for the blast furnace charging distribution chute is symmetrically provided to the distribution chute 300.

As shown in FIG. 8, in the driving apparatus for the blast furnace charging distribution chute according to the second embodiment of the present invention, a pair of working units 200 for driving the distribution chute 300 are symmetrically provided to the distribution chute 300. As shown in FIG. 8, the pair of working units 200 can be driven in connection with each other, and one of the working units 200 may be maintained in a ready state without connection of the power transmission unit 110. Therefore, when one of the working units 200 is out of order, the other one of the working units 200 is connected to the power transmission unit 110, so that manufacturing can be continuously performed.

FIGS. 9A to 9I are views showing operation of the driving apparatus for the blast furnace charging distribution chute according to the first embodiment of the present invention, in which nine examples of operational states of the distribution chute 300 are illustrated according to a relative position between the central line C1 of the load-side crankshaft 10 and the central line C2 of the crankshaft 50 at a tilt angle of 40° in the vertical direction. Here, the operation state of the driving apparatus 500 of the distribution chute 300 is schematically shown in the right side of the figure, and an actual distribution chute 300 is shown in the left side of the figure.

The operational state of the distribution chute 300 is only exemplarily illustrated, and the present invention is not limited thereto. Therefore, the distribution chutes can be modified and operated in various forms.

In the left side conceptual views in FIGS. 9A to 9I, the first left circles schematically illustrate the working unit 200 connected to the distribution chute 300, and the second right circles illustrate the driving unit 5 according to the relation between the central line C1 of the load-side crankshaft 10 and the central line C2 of the crankshaft 50. Bent lines connecting the working unit 200 to the driving unit 5 indicate the power transmission unit 110. The central line C1 is fixed to the center of the second circle while the central line C2 is varied along the circumference of the second circle according to the driving of the cylinder 74. Although the all the radii of the second circles representing the driving unit 5 are identical to each other in FIGS. 9A to 9I for convenience sake, the actual radii of the second circles are continuously varied according to the driving of the cylinder 74.

The power transmission unit 110 represented by the bent line comprises first to third power transmission units connected to the crankshaft. The first power transmission unit comprises the first connection rod 102 connected to the crankshaft 50 arranged on the circumference of the second circle, and drives the first driving lever 112 through the first connection rod 102. The second power transmission unit comprises the first link member 104 connected to the crankshaft 50, the second connection rod 132 and the second link member 135, and drives the second driving lever 137. On the other hand, the third power transmission unit connected in the middle of the second connection rod 132 is fixed to the second fixing link member 156 and the fixing lever 154.

With the driving of the cylinder 74, the central line C2 is eccentrically deviated from the central line C1 in the driving unit 5. Accordingly, through the linear motions of the first and second power transmission units, the driving forces having different intensities are transmitted in different directions to the first and the second driving levers 112 and 137, which are fixedly connected to the distribution chute 300. Therefore, the distribution chute 300 is rotated and tilted at a certain angle, as shown in FIGS. 9A to 9I. Consequently, the charged materials, that is, the iron ore and the coal supplied to the distribution chute 300 are uniformly distributed in the blast furnace.

According to the present invention, a driving apparatus for a blast furnace charging distribution chute is provided in a simple form, so that endurance of the associated facilities can be improved and costs can be reduced.

In addition, a stroke size of a power transmission unit is adjusted by driving a cylinder, so that linear momentum can be remotely controlled.

In addition, since a driving apparatus of a blast furnace charging distribution chute is arranged outside the blast furnace, damage to a heavy-weight rotational facility is reduced, so that endurance of the facility can be improved.

In addition, a driving apparatus of a blast furnace charging distribution chute according to the present invention is provided in a simple form, cooling facility is easily attached, so that high-temperature degradation due to charging pulverized coal can be prevented.

Furthermore, there is little chance that breakdowns due to dust and gas generated in the upper portion of the blast furnace occur.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A driving apparatus for a blast furnace charging distribution chute, comprising:
   a driving unit comprising a crankshaft connected to a motor to rotate with a variable rotational radius;
   a power transmission unit comprising a plurality of connection rods connected to the driving unit to linearly transmit power; and
   a working unit connected to the power transmission unit and fixed to the circumference of a distribution chute to rotate or tilt the distribution chute.

2. A driving apparatus for a blast furnace charging distribution chute, comprising:
   a driving unit comprising a crankshaft connected to a motor to rotate with a variable rotational radius;
   a power transmission unit comprising a plurality of connection rods connected to the driving unit to linearly transmit power; and
   a working unit connected to the power transmission unit and fixed to the circumference of a distribution chute to rotate or tilt the distribution chute,
   wherein the driving unit further comprises a cylinder, and wherein the cylinder is connected to the crankshaft to vary the rotational radius of the crankshaft.

3. The driving apparatus according to claim 2, wherein the driving unit further comprises:
a load-side lever rotatably connected to a driving shaft of the motor;
a first weight having one end connected to the load-side lever and the other end connected to the crankshaft;
a no-load side lever rotatably connected to the cylinder; and
a second weight having one end connected to the no-load side lever and the other end connected to the crankshaft, and
wherein the first and second weights balance reciprocation of the crankshaft.

4. The driving apparatus according to claim 2, wherein the cylinder is fixed to a no-load side crankshaft,
wherein the crankshaft is interposed between a load-side crankshaft connected to the motor and the no-load side crankshaft, and
wherein the load side crankshaft and the no-load side crankshaft are located in the same axis line.

5. The driving apparatus according to claim 4, wherein the cylinder is hydraulically driven, and
wherein oil for the hydraulic drive is supplied by using a rotary joint and the no-load side crankshaft.

6. The driving apparatus according to claim 2, wherein the crankshaft rotates around a central axis of the motor in parallel with the central axis.

7. The driving apparatus according to claim 2, wherein the cylinder is hydraulically driven.

8. The driving apparatus according to claim 1, wherein the power transmission unit comprises:
a first connection rod for transmitting power, the first connection rod having one end connected to the crankshaft and the other end connected to the working unit; and
a second connection rod for transmitting power, the second connection rod having one end connected to the crankshaft and the other hand connected to the working unit at a predetermined angle with the first connection rod,
and wherein the second connection rod transmits power through link members connected to both ends of the second connection rod.

9. The driving apparatus according to claim 8, wherein the second connection rod is supported by a fixing member connected to the lower portion thereof.

10. The driving apparatus according to claim 8,
wherein the first connection rod and one of the link members are connected with each other through the crankshaft substantially, and
wherein the first connection rod is at right angle with the one of the link members.

11. The driving apparatus according to claim 8,
wherein the working unit comprises:
a first driving lever connected to the first connection rod and fixed to the circumference of the distribution chute; and
a second driving lever connected to the link member connected to the second connection rod and fixed to the circumference of the distribution chute, and
wherein the first and the second driving levers are fixed together to a driving body protruded from the circumference of the distribution chute.

12. The driving apparatus according to claim 11, wherein the first driving lever drives an outer driving ring extending from both sides of the driving body around the circumference surface of the distribution chute.

13. The driving apparatus according to claim 12, wherein both ends of the outer driving ring are fixed to bearings arranged in the circumference surface of the distribution chute to allow the outer driving ring to rotate around a center of the bearing.

14. The driving apparatus according to claim 13, wherein the distribution chute is driven by rotating the outer driving ring.

15. The driving apparatus according to claim 11, wherein the second driving lever drives an inner lever horizontally extending from one side of the driving body along the circumference surface of the distribution chute.

16. The driving apparatus according to claim 15, wherein an end of the inner lever is adjacent to a guide member arranged on the circumference surface of the distribution chute to allow the inner lever to rotate in support of the guide member.

17. The driving apparatus according to claim 16, wherein the distribution chute is driven by rotating the inner lever.

18. The driving apparatus according to claim 11, wherein the driving body comprises:
a first driving body connected to the first driving lever, wherein an opening is provided to the first driving body along the axis thereof; and
a second driving body connected to the second driving lever, wherein the second driving body is inserted into the opening of the first driving body.

19. The driving apparatus according to claim 1, wherein the distribution chute is a cylindrical type.

* * * * *